United States Patent
Cristol

(10) Patent No.: US 6,878,357 B1
(45) Date of Patent: Apr. 12, 2005

(54) METHOD FOR PARTICLE SIZE DISTRIBUTION CONTROL IN A BAYER CIRCUIT DECOMPOSITION CHAIN, COMPRISING AN AGGLOMERATION PHASE

(75) Inventor: Benoit Cristol, Marseilles (FR)

(73) Assignee: Aluminium Pechiney, Paris (FR)

( * ) Notice: Subject to any disclaimer, the term of this patent is extended or adjusted under 35 U.S.C. 154(b) by 0 days.

(21) Appl. No.: 09/744,237

(22) PCT Filed: Aug. 12, 1999

(86) PCT No.: PCT/FR99/01975

§ 371 (c)(1),
(2), (4) Date: Feb. 23, 2001

(87) PCT Pub. No.: WO00/14015

PCT Pub. Date: Mar. 16, 2000

(30) Foreign Application Priority Data

Sep. 2, 1998 (FR) .......................................... 98 11111

(51) Int. Cl.$^7$ ................................................ C01F 7/00
(52) U.S. Cl. ...................... 423/121; 423/625; 423/629
(58) Field of Search ................................ 423/121, 122, 423/127, 625, 629, DIG. 5; 23/305 A, 313 R; 700/268

(56) References Cited

U.S. PATENT DOCUMENTS

| | | | |
|---|---|---|---|
| 4,150,952 A | * | 4/1979 | Lafleur et al. ................. 23/301 |
| 4,234,559 A | * | 11/1980 | Tschamper .................. 423/629 |
| 4,511,542 A | * | 4/1985 | Anjier et al. ................ 423/629 |
| 4,614,642 A | | 9/1986 | Cristol et al. |
| 4,732,742 A | | 3/1988 | Puig |
| 4,818,499 A | | 4/1989 | Chantriaux et al. |
| 4,865,825 A | | 9/1989 | Chantriaux et al. |
| 5,158,577 A | * | 10/1992 | Hiscox et al. ................. 23/301 |
| 5,163,973 A | * | 11/1992 | Ellis ........................... 423/629 |
| 5,690,700 A | * | 11/1997 | Hiralal ........................ 423/629 |
| 6,217,622 B1 | * | 4/2001 | Hiscox ........................ 423/127 |

FOREIGN PATENT DOCUMENTS

| | | |
|---|---|---|
| EP | 271104 | 6/1988 |
| FR | 2709302 | 3/1995 |

* cited by examiner

*Primary Examiner*—Steven Bos
(74) *Attorney, Agent, or Firm*—Dennison, Schultz, Dougherty & MacDonald

(57) ABSTRACT

In a BAYER circuit, a process for controlling precipitation in which particle size quality of alumina hydrate produced in the circuit and circulating in feed tanks is monitored utilizing a calibration step and a control step. In the calibration step, cumulative percentage of alumina hydrate particles circulating in the feed tanks in the circuit that are finer than X2 μm, defined as CPFT X2, is measured vs. time and cumulative percentage of alumina hydrate particles circulating in the feed tanks in the circuit that are finer that X1 μm, defined as CPFT X1 vs. time, is measured, where X1 and X2 are predetermined particles sizes and X1 is smaller than X2. A relationship R between CPFT X1 and later changes in CPFT X2, is determined and upper and lower trigger thresholds of CPFT X1 which correspond to maximum permissible variation in CPFT X2 are defined. In the control step, CPFT X1 and CPFT X2 are regularly measured, and R and the correlation between CPFT X2 and the particle size of hydrate produced are updated. Corrective action is taken at the beginning of precipitation when the measured value of CPFT X1 reaches one of the trigger thresholds.

8 Claims, 2 Drawing Sheets

METHOD FOR PARTICLE SIZE DISTRIBUTION CONTROL IN A BAYER CIRCUIT DECOMPOSITION CHAIN, COMPRISING AN AGGLOMERATION PHASE

FIELD OF THE INVENTION

The invention relates to the precipitation of alumina trihydrate according to the Bayer process, carried out in an American type precipitation system including a preliminary agglomeration phase.

DESCRIPTION OF RELATED ART

The Bayer process can produce alumina from bauxite ore, particularly alumina designed to be transformed into aluminum by igneous electrolysis. According to this process, the bauxite ore is treated when hot by means of an aqueous sodium hydroxide solution with an appropriate concentration in order to obtain a suspension containing pregnant sodium aluminate liquor and insoluble residues. After separation of these residues, the pregnant sodium aluminate liquor, also called Bayer liquor, is decomposed by seeding with recycled aluminum trihydroxide particles until aluminum trihydroxide grains (also called alumina trihydrate or hydrargillite) are obtained, and which are themselves then calcinated to obtain an alumina with particular particle size distribution and physicochemical properties. The sodium aluminate liquor depleted in alumina (spent liquor) is then recycled to digest the ore, possibly after being concentrated, by the evaporation and addition of sodium hydroxide or caustic soda.

The productivity of the liquor during its crystallisation is defined by the quantity of alumina restored in the form of alumina trihydrate by crystallisation of the pregnant liquor, related to a given volume of pregnant liquor. The productivity expressed in kilograms of alumina per cubic meter of liquor (kg of $Al_2O_3/m^3$), is related to the caustic concentration in the pregnant liquor. In general, this concentration in American type Bayer processes is close to 100–130 g of Na2O/liter, which is lower than in European type Bayer processes, and this explains why a productivity in the crystallisation of the pregnant liquor is considered to be good when it exceeds 70 kg of $Al_2O_3/m^3$ for an American type Bayer process, or when it exceeds 80 kg of $Al_2O_3/m^3$ for a European type Bayer process.

The difference between European type and American type Bayer processes is in the solid content of the slurry during precipitation. The slurry is the result of introducing a recycled alumina trihydrate seed into the aluminate liquor, and part of the alumina in solution changing to the solid phase. We will define the solid content in the slurry as the weight of solid particles present in the slurry per unit volume of pregnant aluminate liquor entering into the precipitation workshop (and not per unit volume of the suspension).

Alumina to be transformed into aluminum by igneous electrolysis must have a number of properties, including:
good flowability so that electrolysis tanks can be continuously supplied with controlled quantities of alumina,
a high dissolution rate,
a low tendency to dusting.

These properties are closely related to the morphology and the particle size distribution of alumina grains, themselves closely related to the morphology and particle size distribution of hydrargillite particles formed during the precipitation. It is particularly important to limit the proportion of very fine particles that can be classified in two main categories: fines (for which the average diameter is between 10 and 50 $\mu$m) and ultrafines, for which the average diameter is less than 10 $\mu$m. Since a good correlation is observed between the particle size distribution of alumina and the particle size distribution of the production hydrate from which it is derived, an attempt is made to control the particle size of the hydrate circulating in the precipitation series, and particularly in the crystal growth phase. Thus for example, in order to obtain a good quality "metallurgical" alumina, an attempt is made to obtain a circulating hydrate for which the amount passing a 45 $\mu$m sieve is less than 10%, i.e. a suspension containing less than 10% of particles with a diameter of less than 45 $\mu$m. In the rest of this discussion, we will denote the quantity passing X micrometers as "%<X".

Concerning the American type Bayer process, the precipitation comprises a preliminary agglomeration phase characterized by a particularly low solid content. In patent U.S. Pat. No. 4,234,559, the precipitation circuit comprises firstly a series of agglomeration tanks and then a series of feed tanks and finally three classification tanks (primary, secondary, tertiary). While the hydrate produced is derived from the underflow from the primary classification tank, the fines seed originating from the underflow from the tertiary classification tank is inserted in controlled quantities into the series of agglomeration tanks and the larger seed originating from the underflow from the secondary classification tank is added into the series of feed tanks. Since the fines are destroyed during the agglomeration phase, the problem of controlling the particle size of the hydrate produced does not arise.

But attempts are still being made to increase the productivity of the American type Bayer process, which is lower than the productivity of European type Bayer cycles. In U.S. Pat. No. 5,158,577 and EP 0 515 407, only part of the pregnant liquor is added into the agglomeration tank series, and the rest is added directly to the crystal growth. This can result in different solid contents in these two parts of the crystallization system, a low solids content in agglomeration tanks which is essential if it is required that agglomeration should take place under good conditions, and a high solid content in feed tanks which can increase productivity.

But an instability in the precipitation is observed if the solid content is increased at the feed and if the number of agglomeration tanks is limited, with a serious risk of the sudden appearance of large quantities of fines in the circulating hydrate (particle size crisis). This type of crisis should be avoided, since if no correction is made, the particle size quality of the produced hydrate is strongly deteriorated.

The particle size instability is due to a reduction in the ratio between the sum of the production hydrate and the fine seed sent to agglomeration, and the circulating hydrate. A reduction in this ratio makes it impossible to implement effective corrective actions when a drift of the amount passing 45 $\mu$m (%<45) is observed on the circulating hydrate.

SUMMARY OF THE INVENTION

Therefore, the applicant attempted to define a process that could increase the productivity of the American type Bayer process by preventing unacceptable particle size fluctuations, particularly the sudden appearance of large quantities of fines and ultrafines in the circulating hydrate.

The process developed by the applicant is a process for controlling the precipitation of an American type Bayer circuit including a preliminary agglomeration phase, a crystal growth phase and a classification phase, in which the particle size quality of the hydrate produced is monitored by measuring the amount of rotating hydrate passing X2 $\mu$m in feed tanks, characterized in that it comprises:

a) a preparation step carried out once and for all, intended firstly to setup a relation R in intensity and in time between circulating hydrate material passing X1 μm and material passing X2 μm, where X1 is less than X2, and secondly to define trigger thresholds on the value of material passing X1 μm, starting from the maximum authorized variation interval on values passing X2 μm;

b) control of the process itself, carried out during the installation operating period which, apart from the daily measurement of material passing X2 μm and a regular update of the correlation between the said material passing X2 μm and the particle size of the hydrate produced, a daily measurement of the circulating hydrate passing X1 μm and a regular update of the relation R between the said material passing X1 μm and the said material passing X2 μm, and triggering of corrective action in the slurry at the beginning of the precipitation when the measured value of material passing X1 μm reaches one of the regularly updated trigger thresholds determined in the previous step.

This corrective action in the slurry at the beginning of precipitation may be a modification to the temperature of the aluminate liquor added into the agglomeration tank, the addition of additives at the beginning of the crystal growth system such as "Crystal Growth Modifiers" described in U.S. Pat. No. 4,737,352, recycling a part of the end of crystallization slurry, or preferably, modification of the solid content in the slurry in the first agglomeration tank.

The solid content in the slurry in the agglomeration phase may be modified simply by adding more or less pregnant aluminate liquor in the first agglomeration tank, the remaining aliquot being directed to the feed tank. If the quantity of material passing X1 μm is too great, there are too many fines; the amount of pregnant aluminate liquor fed into the agglomeration tank must be increased. If the amount passing X1 μm is too low, there is a risk that productivity will drop; the pregnant aluminate liquor feed from the agglomeration tank must be reduced.

The preliminary step, carried out once only, is intended to determine the relation R and trigger thresholds for the values of X1 μm that will be used at the beginning of application of the process control. This preliminary step comprises the following steps:

a1) Daily measurement of material passing X1 μm in the slurry at a particular point in the precipitation system, which is used to produce a first particle size time diagram represented by a curve Y=%<X1(t).

a2) Daily measurement of material passing X2 μm in the slurry at a particular point in the precipitation system, which is used to produce a second particle size time diagram represented by a curve Y=%<X2(t)and in which X2, greater than X1, is a value already known for its good correlation with the particle size of the hydrate produced. For example, it may be material passing 45 μm measured in slurry at pump-off.

a3) Creation of an empirical relation between the two particle size time diagrams, the purpose of which is to characterize the relation between the variation of the population of material passing X1 μm and the variation of the population of material passing X2 μm, in intensity and in time. This relation R may be written in the form:

$$R(\%<X2(t), \%<X1(t-\tau))=0$$

where t is the date on which material passing X2 μm is measured and τ is a characteristic time interval estimated by observing the occurrence of the same accidental phenomenon on each curve (the same type of extreme, an inflection, etc.).

a4) Definition of the maximum threshold and the minimum threshold of material passing X1 μm, obtained from the relation R previously established and a maximum interval of the authorized variation of values of material passing X2 μm.

The purpose of the relation R is to predict the variation in the particle size, in other words to anticipate crises, by observing the variation in the population of the finest hydrate particles (which have a size of less than X1 μm). The applicant observed that material passing X1 μm enables anticipating a change in the material passing a higher X2 value; an accident on the time diagram %<X1(t) is amplified and shifted in time on the %<X2(t) time diagram. The time shift "τ" is higher as the difference between X1 and X2 increases. In practice, a value X2 greater than 40 μm (normally 45 μm) will be chosen, and the value of X1 will be taken to be less than or equal to 20 μm.

The measurement point is preferably at pump-off, but it may take place earlier, provided that it remains within the crystal growth series. Measurement points for material passing X1 and for material passing X2 may be different. However, they must remain the same throughout the process control and must be as far as possible from the points at which disturbing additions are made irregularly in the slurry.

Measurements referred to as being "daily" are regular measurements and although they are not necessarily daily, they are sufficient frequent to give useable time diagrams.

Concerning the required variation interval of material passing X2 μm, a maximum is defined above which it is known that the particle size of the hydrate produced is no longer satisfactory (too many fines) and a minimum is defined below which it is known that economic operating conditions become bad.

The trigger thresholds are thus determined from the time diagram for the material passing X1 μm, taking account not only of the maximum authorized variation interval on the values of material passing X2 μm, but also the uncertainty of the measurement of material passing X1 μm and the stability of the efficiency of the hydrate classification system.

This preparatory step, at the end of which the time diagrams, the relation R and the trigger threshold become operational, is of the order of three months. But this step can be accelerated either by deliberately triggering an excess creation of fines, or by analyzing previous particle size results if they contain the required information about material passing X1 and X2 μm.

Since precipitation is a complex phenomenon that depends on a large number of parameters (particularly the composition of the treated bauxite that may change in time), instead of using a relation R established once and for all, it is better to use a relation that is regularly updated. Similarly, the correlation between the value of material passing X2 μm and the particle size of the hydrate produced must be updated regularly. This regular updating may be applied at a less frequent rate than daily measurements (for example monthly).

The actual process control comprises the following phases:

b1) A daily measurement of the material passing X1 μm in the slurry at a particular point in the precipitation system, in order to complete the first particle size time diagram represented by the curve Y=%<X1(t).

b2) A daily measurement of the material passing X2 μm in the slurry at a particular point in the precipitation system, in order to complete the first particle size time diagram represented by the curve Y=%<X2(t).

b3) Regular updating(for example monthly) of the empirical relation R between the two particle size time diagrams and the definition of trigger thresholds of material passing X1 μm, or updating after an important modification in a process parameter.

b4) Triggering of a corrective action in the slurry at the beginning of the precipitation when the measured value of material passing X1 μm reaches one of the thresholds defined in b3).

This corrective action is preferably a modification to the solid content in the slurry in the first agglomeration tank. If the maximum threshold is reached, there are too many fines, and the solid content is reduced by introducing a stronger aliquot of the pregnant aluminate liquor into the first agglomeration tank. If the minimum threshold is reached, the feed of pregnant aluminate liquor into the agglomeration tank is reduced and the feed into feed tanks is increased.

As for the preparatory step, empirical relations are determined starting from daily particle size measurements made on the circulating hydrate. As for the preparatory step, the daily rate is not necessarily daily, but is sufficiently frequent to be able to produce useable time diagrams. Trigger thresholds on the "X1 μm passing material" curve are also deduced from the particle size time diagram; they take account of the uncertainty of the measurement of material passing X1, the maximum authorized variation interval on values of material passing X2 μm, and the stability of the efficiency of the hydrate classification system.

For relatively low solid content ($\approx$350 g/l aluminate), it is sufficient to measure amount passing X1=20 μm. This may be done using instruments that diffract laser beams and make mass determinations (Malvern Mastersizer, Cilas, etc.).

But in order to increase productivity, much higher solid content must be achieved, comparable to those achieved in European type processes, in other words greater than 700 g/l aluminate. However, as the solid content in feed tanks increases, the need for a low value of X1 also increases. When the solid content is high, a longer time is necessary to correct particle size disturbances; therefore, it is necessary to have a greater time shift τ; and this time shift is proportional to the difference between X1 and X2.

In this case, it is preferable to measure the amount passing 10 μm, or even a lower value (down to 1.5 μm). When X1 becomes this low, it becomes necessary to use a celloscopic measurement (COULTER or ELZONE) that determines counts rather than mass. These measurements are more difficult, but the economic consequences are negligible.

Productivity can also be increased by increasing the caustic content of the aluminate liquor. The applicant has observed that this method of controlling the particle size can be applied very well on industrial installations with concentrations reaching 160 g of Na2O/liter.

Concerning the corrective action, it is also recommended that an empirical relation should be set up in advance to quantify the effects of the said action, for example during the preparatory phase. Thus, in order to quantify the effects of the modification to the solid content in the first agglomeration tank, the first step will be to establish the actual relation between the said solid content and the proportion of destroyed fines.

EMBODIMENTS OF THE INVENTION

EXAMPLES

The embodiment of the invention will be better understood from the following description of a number of examples.

Figure 1:
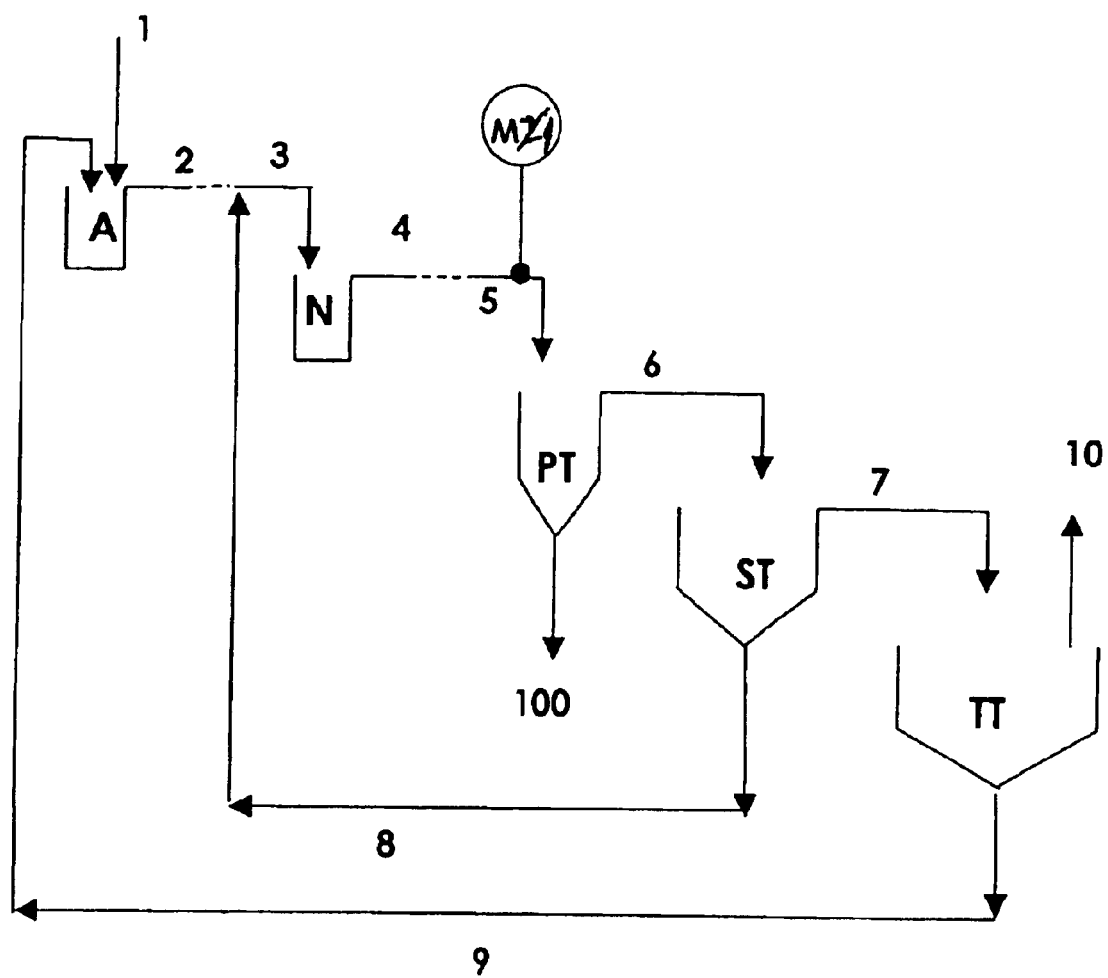
FIG. 1 is a schematic diagram of a prior art Bayer circuit.
Figure 2:
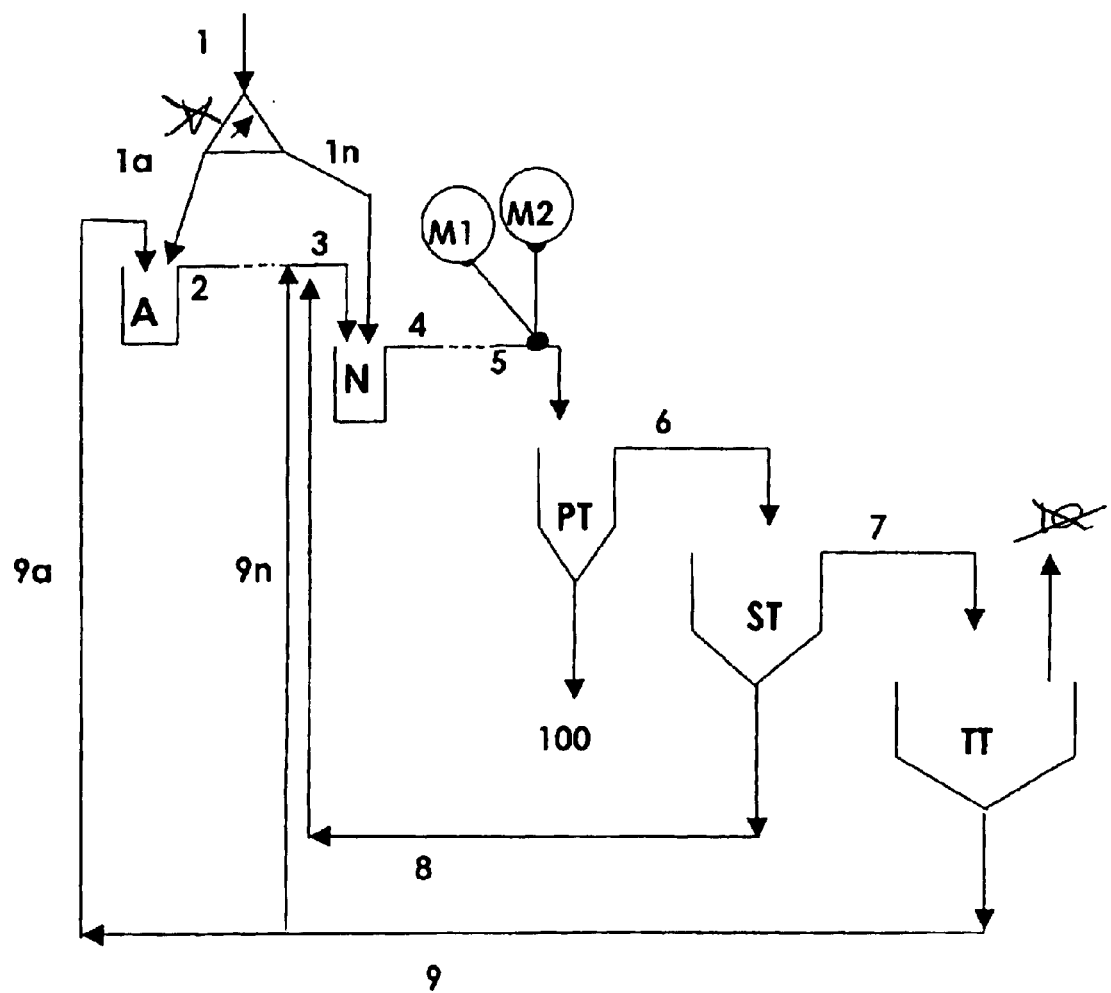
FIG. 2 is a schematic diagram of a Bayer circuit according to the invention.

FIGS. 1 and 2 show the part of the Bayer circuit corresponding to the precipitation phase, the precipitation being of the American type with a preliminary agglomeration step.

FIG. 1 illustrates the first example typical of prior art.

FIG. 2 illustrates subsequent examples describing two embodiments of this invention.

These embodiments are described in examples 2 and 3. To simplify the presentation, we have illustrated the classification phase with all conventional classification devices in example 1. In fact, and particularly with the increase in the solid content, one of ordinary skill in the art could select additional or replacement systems such as cyclones or filters.

Example 1

(Prior Art)

The pregnant aluminate liquor 1 enters the precipitation circuit at a temperature of about 75° C., enters the first agglomeration tank A. It has a caustic concentration of 130 g of Na2O/liter.

The tertiary seed 9, composed essentially of fine and ultrafine particles, is added into the first agglomeration tank A and is mixed with pregnant liquor. The resulting slurry 2 passes through a sequence of agglomeration tanks such that practically all fines and ultrafines have disappeared after an average residence time of about 5 hours. During the agglomeration phase, the solid content in the slurry has increased from 20 g/l aluminate to about 30 g/l aluminate.

At the exit from the agglomeration series, the slurry 3 is added into the first feed tank N with the secondary seed 6, and the addition increases the solid content by 80 g/l aluminate. The new slurry 4 passes through a sequence of feed tanks with an average residence time of about 20 hours, and cooling by about 5° C. At the exit from the feed, the slurry 5, called the "pump-off", has a solid content of about 175 g/l aluminate. By measuring the amount of this slurry 5 passing 45 μm at the exit from the crystal growth M1, the particle size quality of the production hydrate can be estimated so that an optimum variation interval can be defined for this material passing 45 μm. Under the conditions in the example, approximately 10% of material passing 45 μm will give a good quality "metallurgical" alumina.

The slurry 5 at the exit from the crystal growth is then added into the first classifier tank PT. The underflow 100 from the first classifier PT produces production hydrate and the overflow 6 that has a solid content of 100 g/l aluminate, is added into a second classifier tank ST. The underflow from the second classifier tank ST acts as a secondary seed 8 that is reinjected at the beginning of the crystal growth N and the overflow 7, which then has a solid content of only 20 g/liter, is sent to a third classifier tank TT. The overflow 10 from the third classifier tank is the spent aluminum liquor that is reinjected as the bauxite green liquor at the beginning of the Bayer cycle, after concentration by evaporation and the addition of caustic soda. The overflow 9 from the third classifier tank is added back as the tertiary seed into the first agglomeration tank A after filtration and washing.

Example 2

Precipitation According to the Invention with an Average Solid Content in the Circulating Hydrate The pregnant aluminate liquor 1 that enters the precipitation circuit at a temperature of about 75° C., is separated into two aliquots, the first aliquot 1a representing about one third of the total liquor being added into the first agglomeration tank A, and the second aliquot 1n being added into the first feed tank N. The caustic concentration in the pregnant aluminate liquor 1 is 130 g of $Na_2O$/liter.

The tertiary seed 9a, composed essentially of fine and ultrafine particles, is added into a first agglomeration tank A after filtration and partial or complete washing, and is mixed with the pregnant liquor. The resulting suspension 2 follows a sequence of agglomerating tanks such that a predefined proportion of fines and ultrafines has disappeared after an average residence time of 5 hours. During the agglomeration phase, the quantity of hydrate is increased by 10 g/l aluminate entering the workshop (1a and 1n).

The slurry 3 at the exit from the agglomeration series is added into the first feed tank N with the second aliquot 1n of pregnant aluminate liquor, the rest of the tertiary seed 9n, washed or unwashed, and the secondary seed 8, the addition of which increases the solid content by 220 g/l aluminate. The new slurry 4 follows a series of feed tanks with an average residence time of 20 hours and cooling of 5° C. At the exit from the crystal growth, the slurry 5 has a solid content of about 350 g/l alumniate.

The slurry 5 at the exit from the crystal growth is added into a first classifier tank PT. The underflow 100 from the first classifier PT supplies the production hydrate, and the overflow 6 which has a solid content of 250 g/l aluminate is added into a second classifier tank ST. The underflow from the second classifier tank ST acts as a secondary seed 8 that is reinjected at the beginning of the crystal growth N and the overflow 7, which then only has a solid content of 30 g/liter, is sent to the third classifier tank TT.

A measurement M1 of the material passing 45 $\mu$m, and a measurement M2 of the material passing 20 $\mu$m, are made in the slurry every day at pump-off, using a laser diffraction apparatus.

Observations of the particle size quality of the hydrate produced can be used to define the authorized variation interval on values of material passing 45 $\mu$m, and the target set value C on the material passing 20 $\mu$m is defined, by means of the empirical relation defined during the preparation phase and continually updated afterwards.

Depending on the difference between M2 and the value of the set value C defined in advance to guarantee the particle size quality of the product and the differences M2-C obtained in the previous days, the quantity of fines to be agglomerated in addition to or less than the previous day, are determined.

During the preparation phase, the relation between the solid content in the agglomeration phase and the proportion of destroyed fines was determined. This relation is used to fix the aliquot 1a used in the agglomeration. This aliquot 1a fixes the solid content in the agglomeration tanks and therefore the change required for destruction of the fines.

Furthermore, starting from measurements M1 and M2 made on previous days, the relation between the set value C and the required level M1 for the material passing 45 $\mu$m, and secondly the relation between the solid content and fines destroyed in the agglomeration, are adjusted.

Example 3

Precipitation According to the Invention with a High Solid Content in the Circulating Hydrate The pregnant aluminate liquor 1 arriving in the precipitation circuit at a temperature of about 75° C., is separated in two aliquots, the first 1a representing about half of the total liquor being added into the first agglomeration tank A, the second in being added into the first feed tank N. The caustic concentration in the pregnant liquor 1a is 130 g of $Na_2O$/liter.

The filtered tertiary seed 9, composed essentially of fine and ultrafine particles, is added into the agglomeration step A and mixed with the fraction 1a of pregnant liquor. The resulting slurry 2 stays in the agglomeration phase for about 5 hours. The proportion between the quantity of tertiary seed and the flow of liquor 1a is adjusted such that a predefined proportion of fines and ultrafines disappears. The quantity of hydrate during the agglomeration phase is increased by 15 g/l aluminate entering in the workshop (1a and 1n).

At the exit from the agglomeration series, the slurry 3 is added into the first feed tank N and with the second aliquot 1n of pregnant aluminate liquor and the secondary seed 8, the addition of which increases he solid content by 840 g/l aluminate. The new slurry 4 passes through a series of feed tanks with an average residence time of 18 hours and cooling by 10° C. At the exit from the crystal growth, the slurry 5 has a solid content of about 1000 g/l aluminate.

At least one measurement M1 of the material passing 45 $\mu$m is made every day at this location using a laser diffraction apparatus, and a measurement M2 of the material passing 1.5 $\mu$m is made with an ELZONE counter.

The slurry 5 at the exit from the crystal growth is added into a first classifier tank PT. The underflow 100 from the first classifier PT supplies the production hydrate and the overflow 6, that has a solid content of 870 g/l aluminate, is added into a second classifier tank ST. The underflow from the second classifier tank ST is used as a secondary seed 8 that is reinjected at the beginning of the crystal growth N after filtration and the overflow 7, that has a solid content that no longer exceeds 30 g/liter, is sent to the third classifier tank TT.

The process for monitoring and controlling the particle size of the hydrate in the slurry at pump-off is identical to that described in example 2.

The process according to the invention has the following advantages:

particle size fluctuations related to the increase in the inertia of the system originating from the increase in solid contents are avoided.

The productivity of liquors can thus be increased:
by controlling crystallization at high solid contents without endangering the quality of the alumina produced,
by adjusting the pump-off particle size to the maximum level compatible with quality requirements and the production classification system.

What is claimed is:

1. In a BAYER circuit including a preliminary agglomeration phase, a crystal growth phase and a classification phase, a process for controlling precipitation of alumina hydrate from a slurry resulting from introduction of recycled alumina trihydrate seed into an aluminate liquor, in which particle size quality of alumina hydrate produced in the circuit and circulating in feed tanks is monitored, comprising the steps of:

a) a calibration step including:
  a1) measuring, versus time, of:
    percent of alumina hydrate particles circulating in the feed tanks in the circuit that are finer than X2 $\mu$m; and
    percent of alumina hydrate particles circulating in the feed tanks in the circuit that are finer than X1 $\mu$m;
    where X1 and X2 are predetermined particle sizes in microns and X1 is smaller than X2; and
  a2) determining a relationship R between percent finer than X1 and later changes in percent finer than X2 $\mu$m, and defining upper and lower trigger thresholds of percent finer than X1 $\mu$m which correspond to maximum permissible variations in percent finer than X2 $\mu$m; and b) controlling the circuit, comprising measuring percent finer than X2 $\mu$m and forming a correlation between percent finer than X2 $\mu$m and the particle size of hydrate produced by the circuit, measuring percent finer than X1 $\mu$m and updating the relationship R, and causing corrective action to the slurry at the beginning of precipitation when the measured value of percent finer than X1 μm reaches an updated trigger threshold, to bring the percent finer than X2 μm within the maximum permissible variation.

2. Process according to claim 1, wherein said corrective action includes modifying amount of solid in the slurry at the beginning of the precipitation.

3. Process according to claim 2, wherein the modifying comprises varying amounts of pregnant aluminate liquor fed to a first agglomeration tank and a first feed tank.

4. Process according to claim 1, wherein X2 is greater than 40 μm and X1 is less than 20 μm.

5. Process according to claim 1, wherein the measurements of percent finer than X1 μm and percent finer than X2 μm are made on a slurry at the end of crystal growth phase.

6. Process according to claim 1, wherein pregnant aluminate liquor feeding a first agglomeration tank in the circuit has a caustic content less than or equal to 160 g of $Na_2O$/liter.

7. Process according to claim 1, wherein said calibration step comprises:

1) daily measuring percent finer than X1 μm in the slurry at a predetermined point in the circuit, which is used to produce a first particle size vs. time diagram represented by a curve $Y=\%<X1(t)$;

2) daily measuring percent finer than X2 μm in the slurry at a predetermined point in the circuit, which is used to produce a second particle size vs. time diagram represented by a curve $Y=\%<X2(t)$ and in which X2>X1 is a value already known to be well correlated with the particle size of the hydrate produced;

3) creating of an empirical relation between the particle size vs. time diagrams, which characterizes the relation R as:

$$R(\%<X2(t), \%<X1(t-\tau))=0$$

where t is the time at which percent finer than X2 μm is measured and τ is a characteristic time interval estimated by observing an occurrence of a same accidental phenomenon on each curve $\%<X2(t)$ and $\%<X1(t-\tau)$; and 4) defining a maximum threshold and minimum threshold of percent finer than X1 μm obtained from the relationship R and a maximum interval of the permissible variation of values of percent finer than X2 μm.

8. Process according to claim 7, wherein said controlling comprises:

1) daily measuring percent finer than X1 μm in the slurry at a predetermined point in the circuit, in order to complete the first particle size time diagram represented by the curve $Y=\%<X1(t)$;

2) daily measuring percent finer than X2 μm in the slurry at a predetermined point in the circuit, in order to complete the first particle size time diagram represented by the curve $Y=\%<X2(t)$;

3) updating a relationship between curve $Y=\%<X1(t)$ and curve $Y=\%<X2(t)$ and the definition of trigger thresholds of percent finer than X1 μm; and 4) triggering of a corrective action to modify amount of solid in the slurry at the beginning of the precipitation when the measured value of percent finer than X1 μm reaches one of the thresholds defined in 3).

* * * * *